2,946,707

STORAGE BATTERIES AND FLUIDS THEREFOR

Harold H. Sperber, 5627 Hickam Drive, Dayton, Ohio

No Drawing. Filed Sept. 30, 1954, Ser. No. 459,558

17 Claims. (Cl. 136—154)

(Granted under Title 35, U.S. Code (1952), sec. 266)

The invention described herein may be manufactured and used by or for the United States Government for governmental purposes without payment to me of any royalty thereon.

This invention relates to improved storage batteries and fluids therefor and more particularly to an improved battery fluid which comprises electrolyte plus an additive.

Storage batteries are subject to a number of disabilities or limitations, and this is particularly true of the lead-type. Conventionally the electrolyte used in the lead-type is an aqueous solution of about 20% to 40% by weight $H_2SO_4$, and the active ingredients of the charged plates are $PbO_2$ and Pb. During discharge of the battery in use lead sulfate in the form of small crystals is normally formed on both type plates. This lead sulfate is readily converted to $PbO_2$ or Pb during the charge cycle. However, there is a tendency to continually form a certain amount of large crystal $PbSO_4$, which is not readily convertible in the charge cycle to $PbO_2$ or Pb. The formation of the large crystal $PbSO_4$ is normally known as sulfation. Battery life and capacity are reduced by sulfation since the strength of the electrolyte is reduced and plate surface is reduced. Severe sulfation with bridging across of $PbSO_4$ between plates causes shorting out of plates and eventual complete failure of the battery. Also sulfation tends to cause the active outer surface of the plates to fall off and drop to the bottom of the battery case as a sediment. Capacity and battery life are reduced thereby. On the charging cycle there is a tendency for the battery to run hot causing water to be lost by evaporation, and sulfation is increased by the higher temperature operation. When the level of the electrolyte falls below the upper edges of the plates, capacity is reduced, and the exposed portion of the plates resulting from low electrolyte level may tend to crumble and plate area to be permanently lost.

Pasted plates are the most commonly used in lead storage batteries. The pasted plates are normally made by applying a litharge or red lead paste to a lead or lead alloy grid. The paste is made by grinding the powdered lead oxide with sulfuric acid. Additional treating and processing steps are involved. The active surface of the plates formed by this method has a high surface area and is porous and soft. There is a tendency for this active surface material to separate from the plates during the battery operation and fall to the bottom of the battery case. Obviously reduced capacity and life of the battery results due to loss of plate surface area. An additional disability of lead storage batteries is that they tend to lose their charge on standing, i.e., even with nonuse. Other types of storage batteries such as Edison cells, nickel-cadmium types, silver-zinc types, etc., have some, if not all, of the disabilities of the lead-type, as well as other disabilities. Additives for battery electrolytes have been developed in the past in an attempt to eliminate or reduce substantially these battery disabilities, but these additives have not been completely satisfactory in solving the problems.

It is an object of this invention to provide an improved battery fluid for storage batteries. Another object of this invention is to provide a battery fluid which reduces the tendency of the lead storage battery to discharge in nonuse. Still another object of this invention is to provide a battery fluid which causes the lead storage batteries to run cooler during high charge rates. A further object of this invention is to provide a battery fluid which tends to reduce the separation of the active surface from the lead storage battery plates. A still further object of this invention is to provide wet-cell storage batteries having higher capacity maintenance and longer life. An additional object of this invention is to provide a battery fluid which allows lead storage batteries to pick up full charge much more quickly. A particular object of this invention is to provide improved battery fluid containing sulfuric acid electrolyte plus an additive which reduces sulfation in the lead storage battery.

I have discovered that the objects described above and the other objects which will be obvious from the following description may be accomplished by adding to wet-storage battery electrolytes a minor amount of liquid organo-siloxane additive sometimes called silicone oil. Normally the organo-siloxane will be a polymer and should be added to the electrolyte in amounts of from about 0.1% to about 10% by volume based on the electrolyte for maximum effectiveness. More than about 10% by volume organo-siloxane based on the electrolyte will not give any appreciable improvement in the operation of the storage battery and not more than about a 50–50% by volume mix of organo-siloxane and electrolyte should be used since obviously as the percent by volume of organo-siloxane in the battery fluid approaches 100% the capacity of the storage battery will be materially reduced due to the lack of sufficient component having electrolytic properties. The organo-siloxane liquids of my invention are substantially nonelectrolytic and, in fact, are good insulators, so they act to dilute the electrolyte in the battery fluid. As little as a few p.p.m. organo-siloxane in the battery fluid will give some improvement in the battery operation; however, it is usually preferred to use considerably more than this for maximum effectiveness.

Another method of incorporating the organo-siloxane into a battery which has pasted plates is to add the siloxane to the paste used in making the battery plates.

A third method of adding the organo-siloxane to a battery is to dip the battery plates prior to their installation in the battery in a dipping vessel containing the organo-siloxane or a diluted solution thereof.

The liquid organo-silicon polymers with which my invention is concerned are organo-siloxanes which contain radicals attached to the silicon through a carbon atom and silicon atoms are joined to the other silicon atoms by oxygen atoms, thus Si—O—Si. They may be prepared by hydrolysis of hydrolyzable organo-silicanes (also called organo-silanes) and condensation of the hydrolysis products or by hydrolysis of a mixture of different hydrolyzable organo-silicanes and co-condensation of the hydrolysis products. By hydrolyzable organo-silicanes I mean derivatives of $SiH_4$ having the general formula of $R_ySiX_{(4-y)}$ where X is a hydrolyzable group as for example: halogen, amino, alkoxy, aroxy, acyloxy, y is 1, 2, or 3 and R is an organic radical joined through one of its carbon atoms to the silicon atom. Examples of such organic radicals are as follows: alkyl-radicals such as methyl, ethyl, propyl, isopropyl, butyl, amyl, hexyl, heptyl to octadecyl and;

higher; alicyclic radicals such as cyclopentyl, cyclohexyl, etc.; aryl and alkaryl radicals such as phenyl, mono- and poly-alkyl phenyls as tolyl, xylyl, mesityl, mono-, di- and tri-ethyl phenyls, mono-, di- and tri-propyl phenyls, etc.; naphthyl, mono- and poly-alkyl naphthyls as methyl naphthyl, diethyl naphthyl, tripropyl naphthyl, etc.; tetrahydro-naphthyl, anthracyl, etc.; ar-alkyl such as benzyl, phenylethyl, etc.; alkenyl such as methallyl, allyl, etc. The above organic radicals may also contain inorganic substituents such as halogen, etc. The alkylsiloxane polymers having viscosities between about 1 and 1000 centistokes at 25° C. are preferred, and particularly the dimethylsiloxane polymers having viscosities between 1 and 1000 centistokes at 25° C. Reference is made to a book "Chemistry of the Silicones," Rochow, 1947, chapter IV, for more information on these organo-siloxanes.

The electrolyte of my invention is any storage battery electrolyte; e.g., sulfuric acid, aqueous potassium hydroxide, etc., but it is particularly concerned with sulfuric acid electrolyte used in the lead-type storage battery. It is preferred to use distilled water in making up the electrolyte to avoid adding undesirable impurities to the battery. Depending upon the type of service of the battery, the concentration of the sulfuric acid electrolyte will vary from about 20% to 40% by weight $H_2SO_4$. For example, stationary batteries may operate well with a concentration as low as 20% by weight $H_2SO_4$, whereas, starting and lighting batteries may require about 40%.

Plates for the batteries of my invention may be Pb—$PbO_2$, nickel-cadmium, silver-zinc, nickel-iron, etc., but my invention is particularly concerned with the Pb—$PbO_2$ plates of lead storage batteries. Plates for the lead-type batteries have $PbO_2$ for the positive plate and Pb for the negative plate as active ingredients of the battery in the fully charged condition. There are two types of plates which are most commonly used in the lead-type storage battery, although there may be others used to a limited extent, and these are pasted plates and Planté plates. The essential difference between the Planté plates and the pasted plates is that the active materials of the former are derived from the body of the plate itself; whereas, in the latter the active material is formed from oxides or other pastes which are applied to the plate mechanically. Other parts of the batteries such as the case, separators, etc., are conventional. A complete description of these batteries and their method of manufacture is found in the book, "Storage Batteries," by Vinal, third edition, third printing, 1945.

The batteries used in the tests described below were "Willard Batteries," which have transparent cases. The transparent case makes it possible to watch the battery internals in operation and observe deterioration such as sulfation, plate deterioration due to loss of active material, foaming due to gassing, etc. These batteries contained conventional sulfuric acid electrolyte having about 33% by weight $H_2SO_4$ therein. All batteries used in the test were substantially identical in all respects before the addition of the additives. The additives used in this testing were a "DC-200" fluid having a viscosity of about 50 centistokes at 25° C. and "DC Anti-Foam A." The "DC-200" fluids are a series of liquid dimethylsiloxane polymers marketed by the Dow Corning Corporation. These fluids are made in a variety of ranges of between 0.65 and 1,000,000 centistokes at 25° C. For my purpose I prefer to use the fluids having viscosities between about 1 and 1,000 centistokes, i.e., the not too viscous fluids, which range in density from about 6.8 to 8.1 lbs./gal. at 25° C. These fluids are substantially nonmiscible in the sulfuric acid electrolyte. Additional information on the "DC-200's" may be found in a publication "Dow Corning Silicone Notebook, Fluid Series No. 3," issued September 1948, and another publication by Dow, booklet 2003 DC. The "DC Anti-Foam A" is another type of silicone fluid, marketed by the Dow Corning Corporation, which is tasteless, practically odorless, lighter-than-water, and insoluble in the aqueous phase of colloidal systems, and in lower alcohols, glycols, and glycerine; dispersible in kerosene and in aromatic and chlorinated solvents. In concentrations of 1 to 2,000 p.p.m. it kills foams in aqueous and nonaqueous systems. More information on "DC Anti-Foam A" may be found in a Dow publication entitled "Silicone Notes AA2 DC." The "DC Anti-Foam A" and all the "DC-200" series which I prefer to use for my invention are of lower gravity than the sulfuric acid electrolyte, and since they are substantially nonmiscible with the electrolyte, they form a separate layer on top of the electrolyte.

The results of some tests of these additives are described below in Table I. All batteries were substantially identical except for battery additive and were subjected to exactly the same conditions, i.e., the batteries were discharged and charged a number of times on a battery test stand located indoors to see the effects on the batteries. These tests simulate long term testing in routine use. The conditions of the tests were identical for all test batteries and very severe as indicated in Table I by the effects on the battery without additive.

*Table I*

| Battery | Additive | Remarks |
|---|---|---|
| A | "DC-200" [1] | This battery tended to run cooler on high charge than battery C with the result that less water was lost. It picked up a full charge much quicker than battery C. Paste on plates appeared to be in much better condition than that of battery C, and less sediment was formed. This battery tends to hold its charge on standing without use. At the end of the testing there was no visible evidence of sulfation of the plates. |
| B | "DC Anti-foam A" [2] | Remarks for battery B are the same as for battery A, except that there was visible evidence of slight sulfation of the plates in the case of battery B. |
| C | None | This battery tends to lose its charge on standing without use. The sulfation at the end of the testing was visibly very severe in the case of battery C. In fact the battery was completely ruined and would no longer take any appreciable amount of charge. |

[1] This additive has a viscosity of about 50 centistokes at 25° C. Concentration of the additive was 5% by volume based on the electrolyte.
[2] The concentration of the additive was 1% by volume based on the electrolyte.

An analysis of the above tests shows that my battery additives result in substantially improved batteries with few if any of the disabilities of conventional storage batteries.

It is obvious that certain changes and modifications may be resorted to from time to time, by persons skilled in the art, without departing from the spirit of the invention or the scope of the appended claims.

I claim:

1. A battery fluid for a storage battery comprising an electrolyte and from 0.1 to 50% by volume based on said fluid of a stable liquid organo-siloxane.

2. The battery fluid of claim 1 wherein said electrolyte is sulfuric acid.

3. The battery fluid of claim 1 wherein said organo-siloxane is an alkylsiloxane polymer.

4. The battery fluid of claim 3 wherein said alkyl-siloxane is a dimethylsiloxane polymer.

5. A battery fluid for a lead-type storage battery comprising an aqueous solution of about 20% to 40% by weight $H_2SO_4$ to which has been added about 0.1% to about 10% by volume based on said solution of a stable liquid organo-siloxane.

6. The battery fluid of claim 5 wherein said organo-siloxane is an alkylsiloxane polymer.

7. The battery fluid of claim 6 wherein said alkylsiloxane is a dimethylsiloxane polymer.

8. The battery fluid of claim 6 wherein said polymer has a viscosity of between about 1 and 1,000 centistokes at 25° C.

9. The battery fluid of claim 8 wherein said polymer is a dimethylsiloxane polymer.

10. A lead-type storage battery comprising a case, separators, plates, sulphuric acid, and between 0.1 and 50% by volume based on the entire battery fluid of a stable liquid organo-siloxane.

11. The lead-type storage battery of claim 10 wherein said plates are pasted plates and said organo-siloxane is incorporated in the paste during manufacture of the plates.

12. The storage battery of claim 10 wherein said organo-siloxane is an alkylsiloxane polymer having a viscosity between about 1 and 1,000 centistokes at 25° C.

13. The storage battery of claim 12 wherein said alkylsiloxane is a dimethylsiloxane polymer.

14. In a wet cell battery including a casing, means defining a cell within said casing, a pair of electrodes associated with said cell, and a liquid electrolyte in said cell, the improvement which comprises a liquid layer of an organo-siloxane polymer having a specific gravity less than that of said electrolyte floating on said electrolyte.

15. In a wet cell battery including a casing, means defining a cell within said casing, a pair of electrodes associated with said cell, and a liquid electrolyte in said cell, the improvement which comprises a liquid layer of a methyl polysiloxane having a specific gravity less than that of said electrolyte floating on said electrolyte.

16. In a wet cell battery including a casing, means defining a cell within said casing, a pair of electrodes associated with said cell, and a liquid electrolyte in said cell, the improvement which comprises a liquid layer of an organo-siloxane polymer having a specific gravity less than that of said electrolyte floating on said electrolyte, said polymer also providing a thin coating along the walls of said casing to reduce seepage of said electrolyte through said walls.

17. In a wet cell battery including a hard rubber casing, means defining a cell within said casing, a pair of electrodes associated with said cell, and a sulfuric acid electrolyte in said cell, the improvement which comprises a liquid layer of an organo-siloxane polymer having a specific gravity less than that of said electrolyte floating on said electrolyte.

References Cited in the file of this patent

UNITED STATES PATENTS

| | | |
|---|---|---|
| 1,826,724 | Booss et al. | Oct. 13, 1931 |
| 2,437,204 | McGregor et al. | Mar. 2, 1948 |
| 2,467,177 | Zimmer | Apr. 12, 1949 |
| 2,469,883 | Marsden et al. | May 10, 1949 |
| 2,489,138 | Hyde et al. | Nov. 22, 1949 |
| 2,507,200 | Elliott et al. | May 9, 1950 |
| 2,631,117 | Hanchey | Mar. 10, 1953 |
| 2,803,690 | Stevens | Aug. 20, 1957 |

OTHER REFERENCES

Rochow, E. G.: "Chemistry of Silicones," John Wiley and Sons, Inc., New York 1946, pages 66 and 106.

National Bureau of Standards Circular 504, Jan. 10, 1951.